United States Patent [19]

Moineau

[11] Patent Number: 5,293,963
[45] Date of Patent: Mar. 15, 1994

[54] FORKLIFT TRUCK

[75] Inventor: Eric Moineau, Bordeaux-Cauerdan, France

[73] Assignee: Linde Aktiengesellschaft, Fed. Rep. of Germany

[21] Appl. No.: 35,666

[22] Filed: Mar. 23, 1993

[51] Int. Cl.⁵ ............................................. B66B 9/20
[52] U.S. Cl. ................................. 187/9 R; 414/917; 254/2 R
[58] Field of Search ............... 187/9 R, 9 E, 8.71, 187/8.72, 18; 254/10 R, 10 C, 2 R, 45; 414/917, 663, 664, 668

[56] References Cited

U.S. PATENT DOCUMENTS 1,407,124  2/1922  Carr ............................... 187/9 R
1,999,220  4/1935  Towson ........................ 254/10 C

*Primary Examiner*—Kenneth W. Noland
*Attorney, Agent, or Firm*—Webb, Burden, Ziesenheim & Webb

[57] ABSTRACT

A forklift truck having a drive section and a load section which is vertically movable relative to the drive section. A parallelogram hinge connects the drive section to the load section and the load section has a front wall adjacent to a rear wall of the drive section. A cover rests on the upper edge of the rear wall of the drive section and has an edge adjacent to the upper edge of the front wall of the load section. The upper portion of the front wall of the load section is formed with a convex curve toward the drive section. When the load section is raised and lowered on the parallelogram hinge an essentially constant distance is maintained between the edge of the top cover and the upper edge of the front wall of the load section.

4 Claims, 4 Drawing Sheets

FORKLIFT TRUCK

BACKGROUND OF THE INVENTION

1. Field of the Invention

This invention relates generally to a forklift truck having a drive section and a vertically adjustable load section. The load section is connected to the drive section by a parallelogram hinge. The load section has a front wall perpendicular to the longitudinal axis of the vehicle located next to the rear wall of the drive section. The upper portion of the rear wall of the drive section has an edge parallel to and spaced from the front wall of the load section.

Forklift trucks of the type described herein are low lift trucks which are used, for example, as electric hand-guided trucks. The battery is installed in a compartment in the drive section, and the front wall of the load section defines the cargo space adjacent to the drive section.

2. Description of the Related Prior Art

On prior art forklift trucks of the type to which the invention is directed, the front wall of the load section is one element of a battery compartment. On such trucks, the battery is transported along with the load section and is moved vertically with the load section. The drive section has a housing in which the drive unit and the lifting mechanism are located. The housing on the drive section generally has a top cover with an edge located at the juncture of the top cover and the rear wall of the housing adjacent to the front wall of the load section.

There is generally a narrow gap between the edge of the top cover and the front wall of the load section. When the load section is raised, the width of this gap initially increases. Because of the parallelogram hinge, the front wall of the load section moves through an arc, and therefore moves farther away from the rear wall of the drive section as the load section is raised. According to the design of the parallelogram hinge, the width of the gap decreases as the end of the lifting motion of the load section is approached. If the lift truck operator inadvertently places his fingers into the gap during the vertical movement of the load section, his fingers can be caught and crushed or severed.

SUMMARY OF THE INVENTION

The object of the present invention is to provide a forklift truck of the type described above which includes an improved safety feature. This object is achieved by forming the front wall of the load section, when seen in cross section parallel to the longitudinal axis of the vehicle, with a convex curve facing the rear wall of the drive section so that when the load section is raised and lowered, the gap between the front wall of the load section and the rear wall of the housing on the drive section is essentially uniform at all times. The change in the distance between the front wall of the load section and the rear wall of the housing on the drive section, in the hazardous area of the edge of the top cover, is eliminated by the shape of the front wall of the load section. Thus, the danger of injury to the operator at this point is substantially eliminated. Maximum safety is achieved if the gap between the front wall of the load section and the rear wall of the housing on the drive section is always so narrow that the operator's fingers cannot be inserted therein.

In an advantageous refinement of the invention, the convex curve corresponds to a segment of a circular arc having the same radius as the radius of the circular arc over which the movable ends of the parallelogram hinge move. Thus, a constant distance between the edge of the top cover and the front wall of the load section is maintained at all times.

The invention has particular application to a forklift truck which is operated by an electric battery, and on which the front wall of the load section is part of a battery compartment. On such a forklift truck the load section is lowered by opening a valve on a hydraulically driven lifting mechanism. The downward movement of the load section is very rapid and forceful, even when the forks are empty because of the weight of the battery and it is particularly important to eliminate the hazard described above.

A complete understanding of the invention will be obtained from the following description when taken in connection with the accompanying drawings wherein like reference characters identify like parts throughout.

DESCRIPTION OF THE PREFERRED EMBODIMENT

Figure 1:
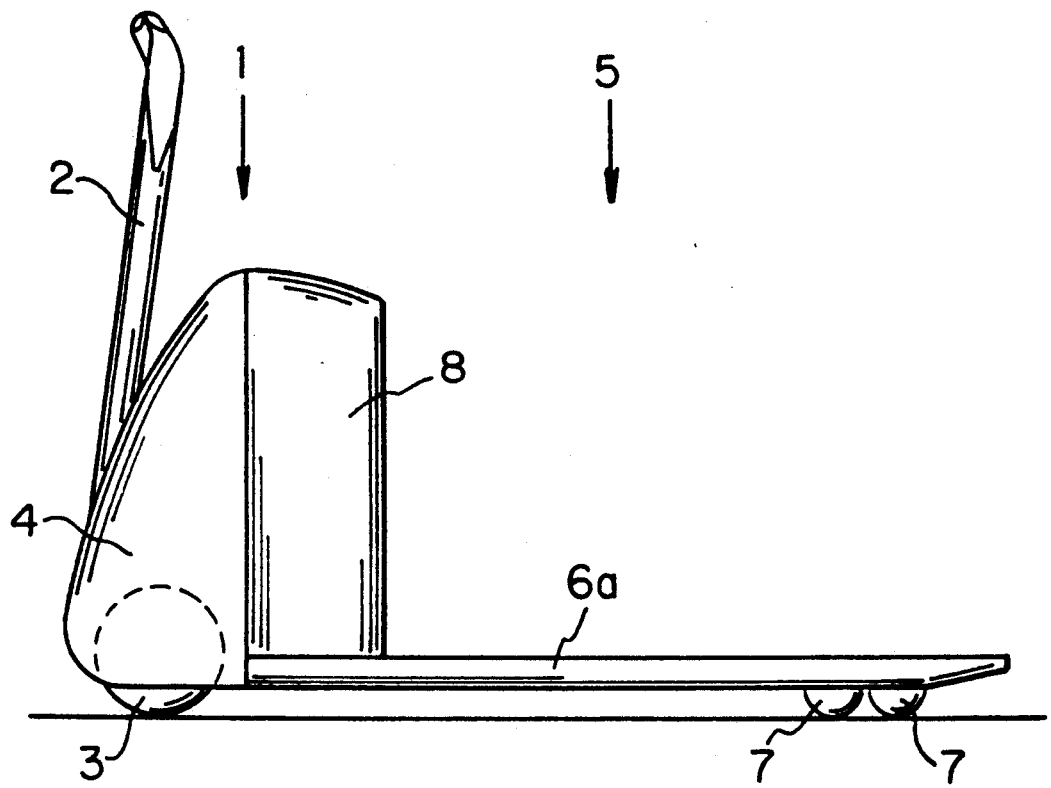
FIG. 1 is a side elevation of a forklift truck.
Figure 2:
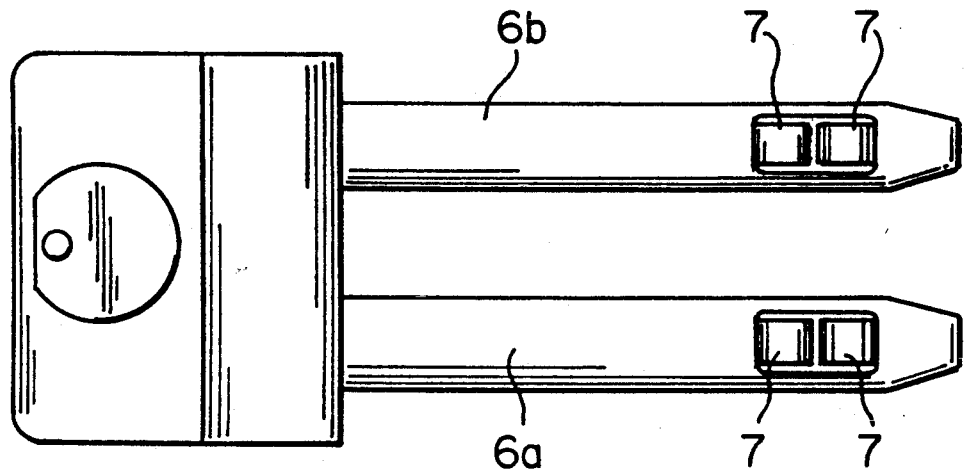
FIG. 2 is a plan view of the forklift truck shown in FIG. 1.

The forklift truck according to the invention is an electric hand-guided truck having a drive section 1 with a handle 2, a drive wheel 3 and a housing 4 containing the drive unit. A load section 5 has two spaced, substantially parallel forks 6a and 6b with tandem load rollers 7 on the outer ends and is connected to drive section 1 in a manner not shown in FIGS. 1 and 2 of the drawings. A battery compartment 8 on load section 5 is located immediately adjacent to drive section 1.

Figure 3:
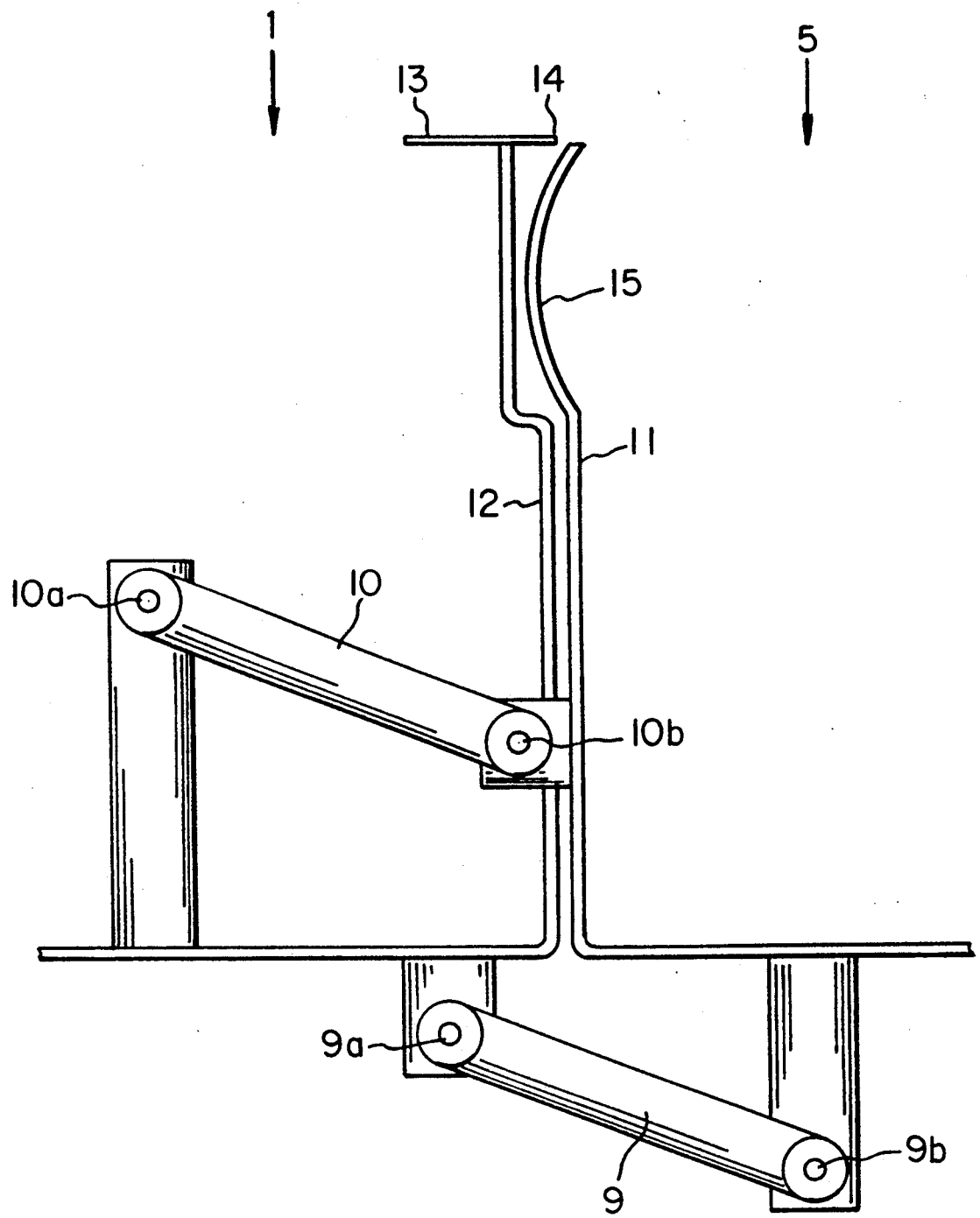
FIG. 3 is a side elevation of the parallelogram hinge and the configuration of the forklift truck walls according to the invention with the load section lowered.
Figure 4:
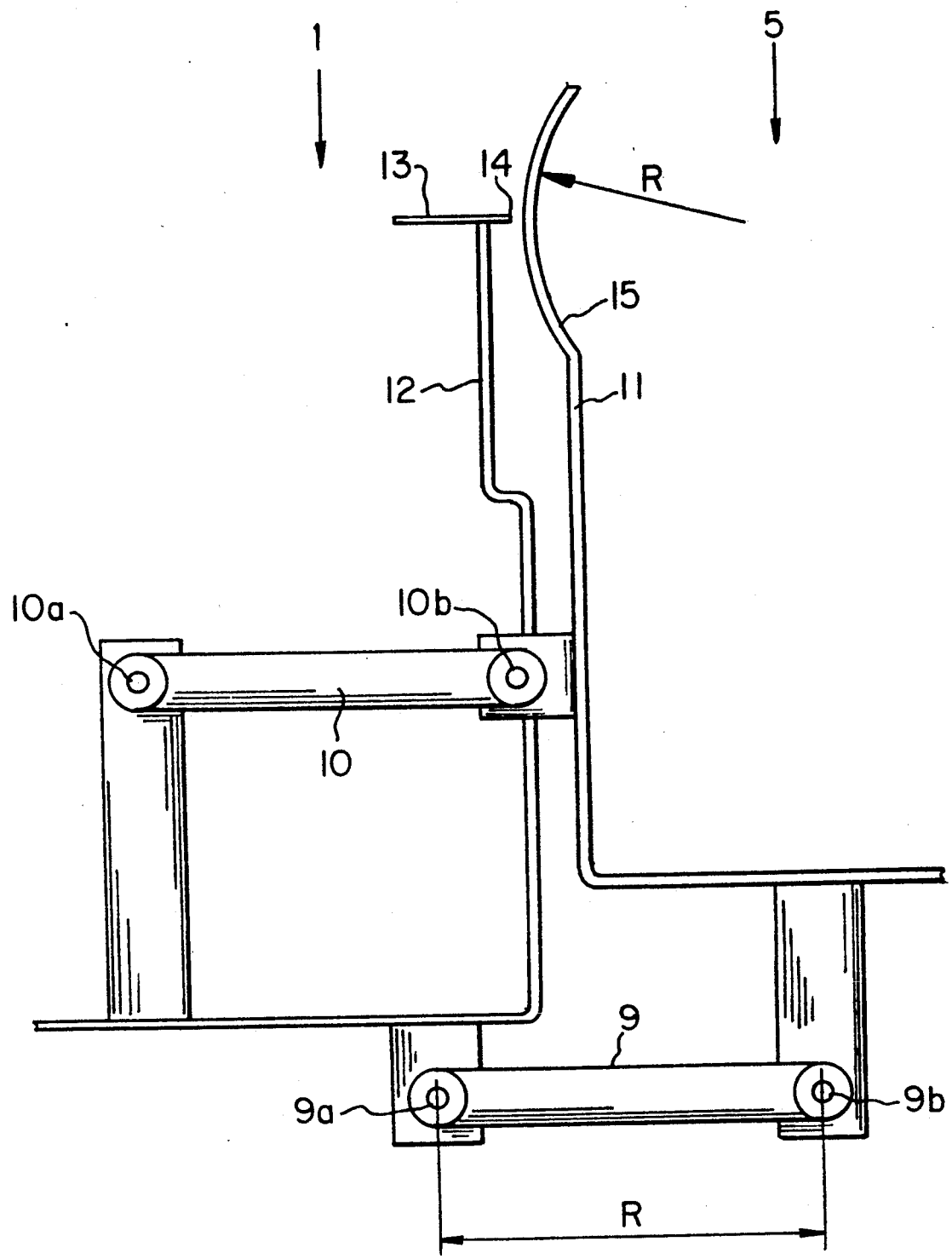
FIG. 4 is a side elevation of the parallelogram hinge with the load section in an intermediate position.
Figure 5:
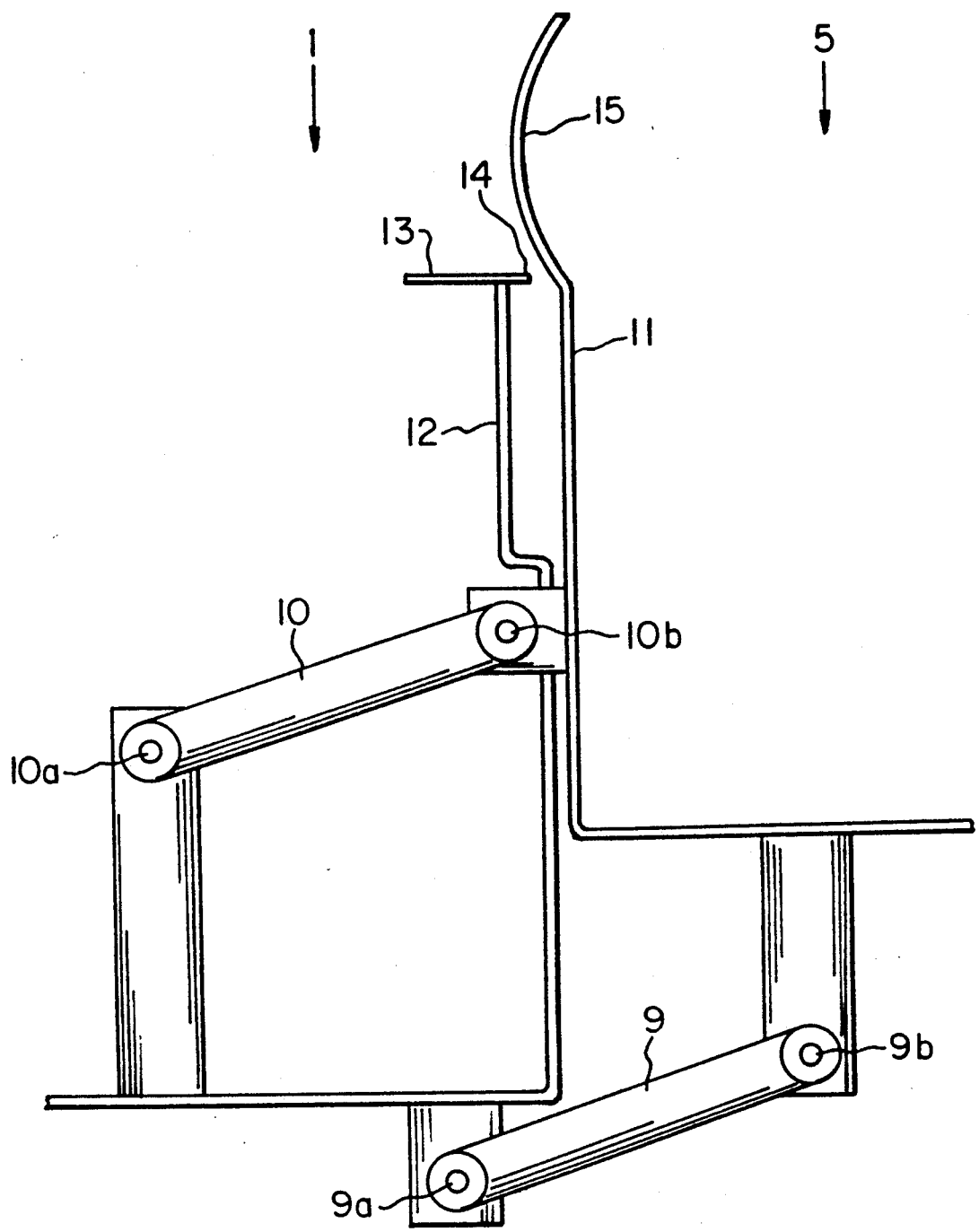
FIG. 5 is a side elevation of the parallelogram hinge with the load section raised.

FIGS. 3-5 of the drawings show a schematic connection between drive section 1 and load section 5. The connection is formed by a parallelogram hinge which has parallel links 9 and 10, which are connected at one end with hinge points 9a and 10a, respectively, on drive section 1, and on the other end with hinge points 9b and 10b, respectively, on load section 5. The apparatus for raising and lowering load section 5 is not shown.

FIG. 3 of the drawings shows load section 5 in the fully lowered position. A gap exists between a front wall 11 on load section 5 which forms a part of battery holding compartment 8 and a rear wall 12 on drive section 1. Rear wall 12 is a part of housing 4 and is parallel to front wall 11. The gap between walls 11 and 12 is so narrow that under normal conditions the operator's fingers cannot be inserted into it. Depending on the design, front wall 11 may be in direct contact with rear wall 12. A top cover 13 closes the top of housing 4 and is located on rear wall 12 and the top cover has an edge 14. If there is no top cover on rear wall 12, the edge is formed by the upper end of the rear wall. On conventional forklift trucks, a gap having a varying width may be formed between edge 14 and front wall 11 when load section 5 is being raised or lowered. The operator's fingers can be injured or severed if the operator leans forward beyond drive section 1 and places his hands on cover 13 or on edge 14, so that his fingers inadvertently extend into the gap.

To eliminate this hazard, a portion of front wall 11, in the area adjacent edge 14 on rear wall 12, is formed with a convex curved portion 15 toward rear wall 12. The rear wall is formed with an offset in this area to accommodate the curved portion 15 of the front wall. The distance between edge 14 of cover 13 and the upper portion of front wall 11 is the same as the distance between the lower end of front wall 11 and rear wall 12.

FIG. 4 of the drawings shows the forklift truck with the load section in an intermediate position. As a result of the curved portion 15 of front wall 11, the distance between edge 14 and the front wall is always the same during raising and lowering of the load section. This is the case in particular if curved portion 15 is a segment of a circular arc having a radius R equal to the radius of the circular arc through which hinge points 9b and 10b of the parallelogram hinge move.

FIG. 5 of the drawings shows the forklift truck with load section 5 fully raised. In this position, the distance between edge 14 of top cover 13 and front wall 11 is the same so that the width of the gap remains so narrow that the operator's fingers cannot be inserted into it.

While a specific embodiment of the invention has been described in detail herein, it will be appreciated by those skilled in the art that various modifications and alternatives to the embodiment could be developed in light of the overall teachings of the disclosure. Accordingly, the particular arrangement is illustrative only and is not limiting as to the scope of the invention which is to be given the full breadth of the appended claims and any and all equivalents thereof.

I claim:

1. A forklift truck having a drive section and a load section vertically movable relative to the drive section, a parallelogram hinge connecting said drive section to said load section, said load section having a front wall adjacent to said drive section perpendicular to the longitudinal axis of said truck, said drive section having a rear wall opposite said front wall of said load section, a top cover resting on said rear wall of said drive section and having an edge adjacent to said front wall of said load section, said front wall of said load section having an upper portion with a convex curve toward said drive section, whereby when said load section is raised and lowered on said parallelogram hinge an essentially constant distance is maintained between said edge of said top cover and the surface of said convex curve upper portion of said front wall of said load section.

2. A forklift truck as set forth in claim 1 wherein said convex curve corresponds to a segment of a circular arc having a radius equal to the radius of a segment of a circular arc over which the movable ends of said parallelogram hinge move.

3. A forklift truck as set forth in claim 2 wherein said forklift truck is adapted to be operated by an electric battery and said front wall of said load section is a portion of a battery holding compartment located on said load section.

4. A forklift truck as set forth in claim 1 wherein said forklift truck is adapted to be operated by an electric battery and said front wall of said load section is a portion of a battery holding compartment located on said load section.

* * * * *

UNITED STATES PATENT AND TRADEMARK OFFICE
CERTIFICATE OF CORRECTION

PATENT NO. : 5,293,963
DATED : March 15, 1994
INVENTOR(S) : Eric Moineau

It is certified that error appears in the above-indentified patent and that said Letters Patent is hereby corrected as shown below:

Title page, after item [22], insert --Foreign Application Priority Data Mar. 26, 1992 [DE] Germany ... 4209860--.

Column 4 claim 4, line 30, "1" should read --2--.

Signed and Sealed this

Ninth Day of August, 1994

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,293,963
DATED : March 15, 1994
INVENTOR(S) : Eric Moineau

It is certified that error appears in the above-indentified patent and that said Letters Patent is hereby corrected as shown below:

Title page, after item [22], insert
--Foreign Application Priority Data
Mar. 26, 1992[DE]Germany...4209860--.

Claim 4 Line 30 Column 4 "1" should read --2--.

Signed and Sealed this

Sixth Day of September, 1994

Attest:

BRUCE LEHMAN

*Attesting Officer*          *Commissioner of Patents and Trademarks*